US008282407B1

United States Patent
Qu et al.

(10) Patent No.: US 8,282,407 B1
(45) Date of Patent: Oct. 9, 2012

(54) CARD CONNECTOR WITH TWO SWITCH TERMINALS EACH WITH A LOCATING PORTION AND A FASTENING PORTION

(75) Inventors: Zhi-Cheng Qu, New Taipei (TW);
Bing-Tao Yang, New Taipei (TW);
Yin-Lung Wu, New Taipei (TW);
Ming-Chiang Chen, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/205,754

(22) Filed: Aug. 9, 2011

(51) Int. Cl.
*H01R 29/00* (2006.01)
(52) U.S. Cl. ...................................................... 439/188
(58) Field of Classification Search .................. 439/188, 439/489, 157, 260, 63
See application file for complete search history.

(56) References Cited

U.S. PATENT DOCUMENTS

| | | | | |
|---|---|---|---|---|
| 6,382,994 B1 * | 5/2002 | Chang | ............................ | 439/157 |
| 6,719,577 B2 * | 4/2004 | Nogami | ........................ | 439/188 |
| 6,749,450 B1 * | 6/2004 | Chen | .............................. | 439/188 |
| 7,416,428 B1 * | 8/2008 | Hung et al. | .................... | 439/188 |
| 7,435,117 B2 * | 10/2008 | Ma | ................................. | 439/188 |

* cited by examiner

Primary Examiner — Chandrika Prasad
(74) Attorney, Agent, or Firm — WPAT, P.C.; Anthony King

(57) ABSTRACT

A card connector for receiving a card includes an insulating housing, a plurality of conductive terminals received in the insulating housing, a first switch terminal, a second switch terminal and a shielding shell covered on the insulating housing. The insulating housing defines a first switch groove, a second switch groove, a first fastening groove and a second fastening groove. The first switch terminal includes a first fastening portion fastened in the first fastening groove, a first locating portion located in the first switch groove, and a first contact portion hung over the insulating housing. The second switch terminal includes a second fastening portion fastened in the second fastening groove, a second locating portion located in the second switch groove, and a second contact portion hung over the insulating housing to electrically contact with the first contact portion under the pressure of the card.

9 Claims, 4 Drawing Sheets

US 8,282,407 B1

CARD CONNECTOR WITH TWO SWITCH TERMINALS EACH WITH A LOCATING PORTION AND A FASTENING PORTION

BACKGROUND OF THE INVENTION

1. Field of the Invention

The present invention generally relates to a card connector, and more particularly to a card connector having a switch terminal.

2. The Related Art

A traditional card connector includes a shielding shell, an insulating housing, a plurality of conductive terminals and a pair of switch terminals. The insulating housing defines a plurality of terminal grooves and a pair of switch grooves for receiving the conductive terminals and the switch terminals. The shielding shell is covered on the insulating housing to define an inserting groove between the shielding shell and the insulating housing for receiving a card therein. However, the width dimension of the traditional card connector is small and the switch terminal has a short elastic arm. As a result, when the card is inserted into the inserting groove of the card connector, the switch terminal will be yielded to loose switch function thereof. Otherwise, portions of the switch terminal fastened in the insulating housing are too few to cause the switch terminal to be unsteadily assembled in the insulating housing. As a result, normal function of the card connector is affected.

SUMMARY OF THE INVENTION

An object of the present invention is to provide a card connector adapted for receiving a card therein includes an insulating housing, a plurality of conductive terminals, a first switch terminal, a second switch terminal and a shielding shell. One side of a top of the insulating housing has a front protruded upward to form a protrusion, and defines a first switch groove and a second switch groove substantially parallel to and spaced from each other to define a resisting wall therebetween. A front end of the first switch groove extends forward into the protrusion and then extends upward to form a first fastening groove. A front end of the second switch groove extends forward into the protrusion and then extends upward to form a second fastening groove. The conductive terminals are received in the insulating housing and project beyond the top of the insulating housing for electrically connecting with the card. The first switch terminal has a first fastening portion fastened in the first fastening groove, a first locating portion connected with a bottom of a rear of the first fastening portion to be located in the first switch groove, and a first contact portion connected with a top of the rear of the first fastening portion to be hung over the resisting wall. The second switch terminal has a second fastening portion fastened in the second fastening groove, a second locating portion connected with a bottom of a rear of the second fastening portion to be located in the second switch groove, and a second contact portion connected with a top of the rear of the second fastening portion to be hung over the top of the insulating housing and apart facing to the first contact portion of the first switch terminal so as to electrically contact with the first contact portion under the pressure of the card. The shielding shell is covered on the insulating housing to define a receiving space therebetween for receiving the card therein.

As described above, on one hand, the first contact portion is located over the first locating portion to make the first contact portion have an enough length so as to avoid the first switch terminal being yielded to loose switch function. On the other hand, the first locating portion and the first fastening portion are fully fastened in the first switch groove and the first fastening groove to make the first switch terminal fastened in the insulating housing firmly and steadily. Beneficial effect of the second switch terminal is the same as that of the first switch terminal.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
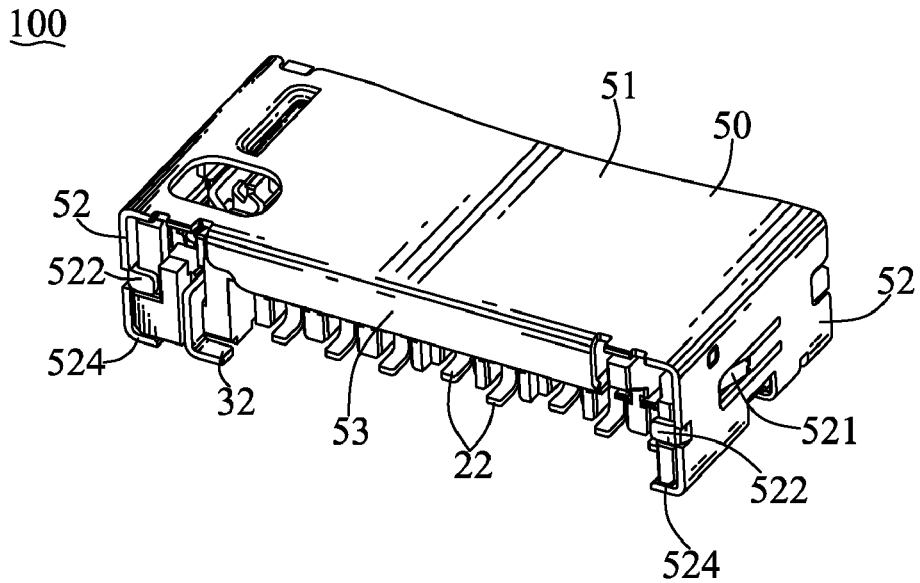
FIG. 1 is a perspective view of a card connector in accordance with the present invention.
Figure 2:
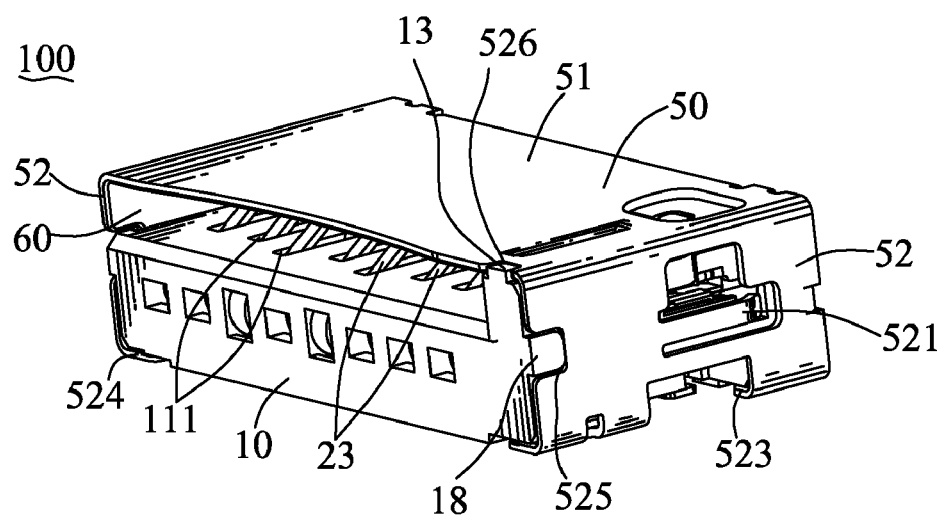
FIG. 2 is another angle perspective view of the card connector of FIG. 1.

With reference to FIGS. 1-5, a card connector 100 in accordance with the present invention is shown. The card connector 100 includes an insulating housing 10, a plurality of conductive terminals 20, a first switch terminal 30, a second switch terminal 40 and a shielding shell 50.

Figure 3:
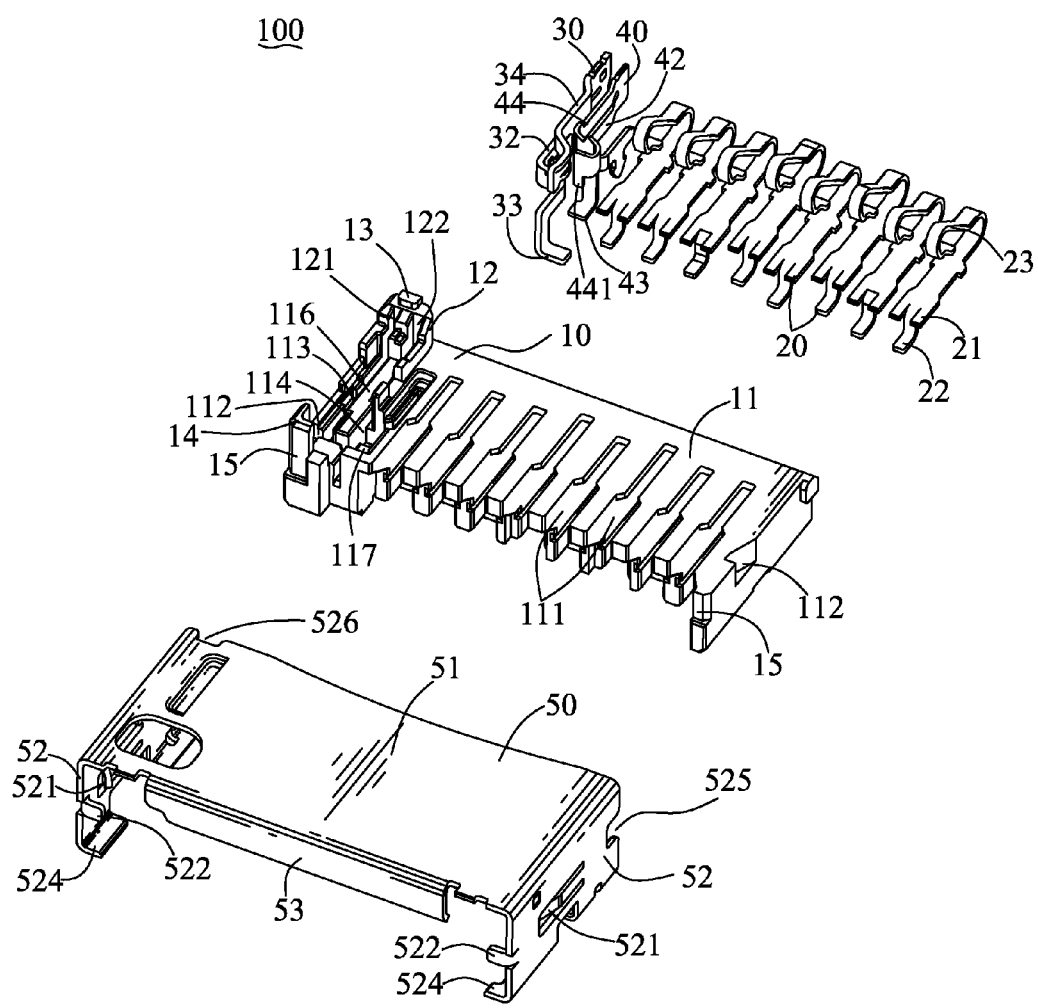
FIG. 3 is an exploded view of the card connector of FIG. 1.
Figure 4:
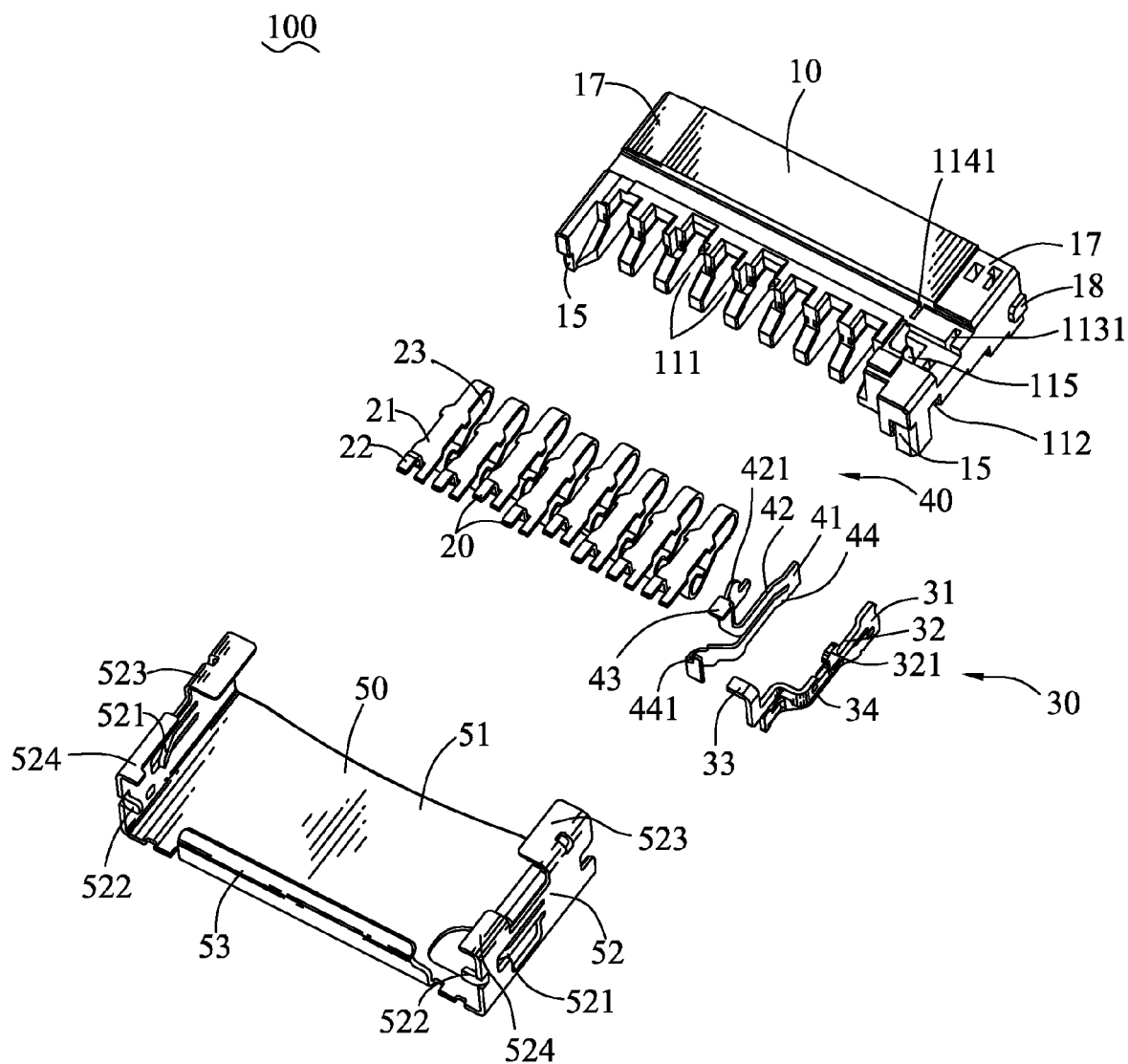
FIG. 4 is another angle exploded view of the card connector of FIG. 1.

Referring to FIGS. 3-4, the insulating housing 10 has a base board 11 of a substantial rectangular shape. A front of one side of a top of the base board 11 protrudes upward to form a protrusion 12. A middle of a top of the protrusion 12 protrudes upward to form a clipping portion 13. A rear of the base board 11 defines a plurality of terminal grooves 111 arranged at regular intervals along a transverse direction of the base board 11. Each of the terminal grooves 111 extends longitudinally to penetrate through a rear end of the base board 11. Each side surface of the base board 11 is concaved inward to form a clipping groove 112. The one side of the top of the base board 11 defines a first switch groove 113 of a three line break shape and a second switch groove 114 of a U shape seen from a vertical view, which are located behind the protrusion 12 and spaced from each other to define a resisting wall 116 therebetween, wherein the resisting wall 116 is substantially parallel to the terminal grooves 111 and the second switch groove 114 is nearer to the outmost terminal groove 111 than the first switch groove 113. A front of a bottom wall of the first switch groove 113 defines a first inserting hole 1131. A front of a bottom wall of the second switch groove 114 far away from the first switch groove 113 defines a second inserting hole 1141.

A rear end of the first switch groove 113 penetrating through the rear end of the base board 11 and a front end of the first switch groove 113 extends forward into the protrusion 12 and then extends upward to form a first fastening groove 121. One front end of the second switch groove 114 adjacent to the first switch groove 113 extends forward into the protrusion 12 and then extends upward to form a second fastening groove 122. A rear of the second switch groove 114 extends rearward to form an opening 115 vertically penetrating through the base board 11. A portion of the top of the base board 11 facing to the opening 115 and adjacent to the rear end of the first switch groove 13 is concaved downward to form a locating groove 117. A corner of the one side of the base board 11 protrudes upward to form a supporting block 14 flush with the protrusion 12. Two opposite ends of a rear side of the base board 11 respectively define a buckling groove 15. Two ends of a front of a bottom of the base board 11 define two recesses 17. Front ends of the two side surfaces of the base board 11 oppositely protrude sideward to form two fixing portions 18.

Referring to FIG. 3 and FIG. 4, each of the conductive terminals 20 has a base arm 21, a soldering arm 22 bent downward and then extended rearward from a rear end of the base arm 21, and a contact arm 23 arced towards the base arm 21 from a front end of the base arm 21.

Referring to FIG. 4, the first switch terminal 30 has a first fastening portion 31, a first locating portion 32 of a three line break shape connected with a bottom of a rear of the first fastening portion 31, a first soldering portion 33 extending downward and then bent sideward from a bottom of a rear end of the first locating portion 32, and a curved first contact portion 34 connected with a top of the rear of the first fastening portion 31 and staggered with the first locating portion 32. A front of a bottom of the first locating portion 32 protrudes downward to form a first inserting portion 321.

Referring to FIG. 4 again, the second switch terminal 40 has a second fastening portion 41, a second U-shaped locating portion 42 connected with a bottom of a rear of the second fastening portion 41, a second soldering portion 43 extending downward and then bent rearward from a bottom of a middle of the second locating portion 42, and a curved second contact portion 44 connected with a top of the rear of the second fastening portion 41. A bottom of a free end of the second locating portion 42 protrudes downward to form a second inserting portion 421. A free end of the second contact portion 44 protrudes downward to form a resisting portion 441.

Figure 5:
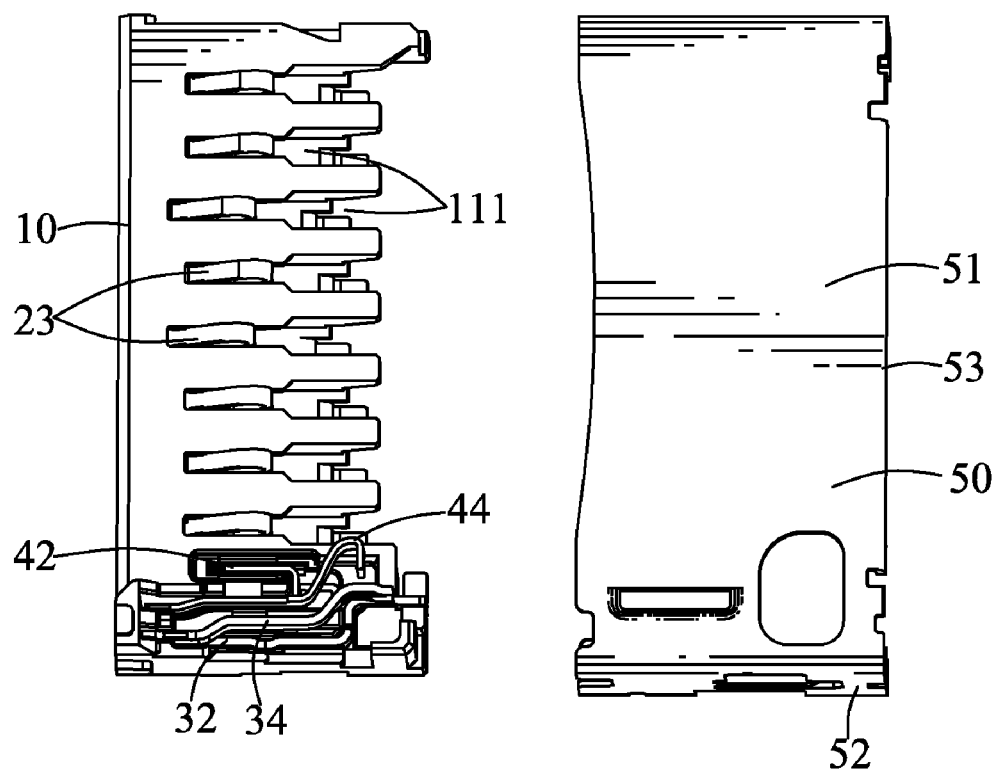
FIG. 5 is a partial exploded view of the card connector of FIG. 1.

Referring to FIG. 3, FIG. 4, and FIG. 5, the shielding shell 50 has a top plate 51 and two side plates 52 protruded downward from two opposite sides of the top plate 51. A middle of a rear end of the top plate 51 is bent downward to form a blocking plate 53. Middles of the two side plates 52 are punched inward to form two clipping pieces 521. Middles of two rear edges of the two side plates 52 are bent towards each other to form two buckling pieces 522. A front end and a rear end of a bottom of each side plate 52 are bent inward to form a first locating piece 523 and a second locating piece 524. A middle of a front edge of each side plate 52 defines a fixing groove 525. A side of a front edge of the top plate 51 defines a notch 526.

Referring to FIGS. 1-5, when the card connector 100 is assembled, the conductive terminals 20 are assembled in the terminal grooves 111 of the insulating housing 10 with the base arms 21 located in the terminal grooves 111, the contact arms 23 hung over the terminal grooves 111 and the soldering arms 22 projected behind the base board 11 of the insulating housing 10. Then the first switch terminal 30 and the second switch terminal 40 are assembled in the insulating housing 10. The first fastening portion 31 is fastened in the first fastening groove 121. The first locating portion 32 is located in the first switch groove 113 with the first inserting portion 321 inserted in the first inserting hole 1131 and the first soldering portion 33 stretched behind the base board 11. The first contact portion 34 is located on the resisting wall 116. The second fastening portion 41 is fastened in the second fastening groove 122. The second locating portion 42 is disposed in the second switch groove 114 with the second inserting portion 421 inserted in the second inserting hole 1141. The second soldering portion 43 is exposed to the bottom of the base board 11 from the opening 115. The second contact portion 44 is hung over the base board 11 and apart faces to the first contact portion 34 of the first switch terminal 20, with the resisting portion 441 disposed in the locating groove 117.

At last, the shielding shell 50 is covered on the insulating housing 10 with a receiving space 60 formed between the top of the base board 11 and the top plate 51 for receiving a card (not shown). The top plate 51 is supported on the protrusion 12 and the supporting block 14 with the clipping portion 13 buckled in the notch 526. The clipping pieces 521 of the side plates 52 are clipped in the clipping grooves 112 of the base board 11. The buckling pieces 522 are buckled in the buckling grooves 15. The first locating pieces 523 are received in the recesses 17 and the second locating pieces 524 are located under the rear end of the base board 11. The fixing portions 18 are buckled in the fixing grooves 525. The blocking plate 53 blocks a rear end of the receiving space 60 for avoiding an excessive insertion of the card. In use, the second contact portion 44 of the second switch terminal 40 is pressed sideward by the card to electrically contact with the first contact portion 34 of the first switch terminal 30 so as to realize a switch function.

As described above, on one hand, the first contact portion 34 is located over the first locating portion 32 to make the first contact portion 34 have an enough length so as to avoid the first switch terminal 30 being yielded to loose switch function. On the other hand, the first locating portion 32 and the first fastening portion 31 are fully fastened in the first switch groove 131 and the first fastening groove 121 to make the first switch terminal 30 fastened in the insulating housing 10 firmly and steadily. Beneficial effect of the second switch terminal 40 is the same as that of the first switch terminal 30.

What is claimed is:

1. A card connector adapted for receiving a card therein, comprising:
    an insulating housing of which one side of a top has a front protruded upward to form a protrusion and defines a first switch groove and a second switch groove substantially parallel to and spaced from each other to define a resisting wall therebetween, a front end of the first switch groove extending forward into the protrusion and then extending upward to form a first fastening groove, a front end of the second switch groove extending forward into the protrusion and then extending upward to form a second fastening groove;
    a plurality of conductive terminals received in the insulating housing and projecting beyond the top of the insulating housing for electrically connecting with the card;
    a first switch terminal having a first fastening portion fastened in the first fastening groove, a first locating portion connected with a bottom of a rear of the first fastening portion to be located in the first switch groove, and a first contact portion connected with a top of the rear of the first fastening portion to be hung over the resisting wall;
    a second switch terminal having a second fastening portion fastened in the second fastening groove, a second locating portion connected with a bottom of a rear of the second fastening portion to be located in the second switch groove, and a second contact portion connected with a top of the rear of the second fastening portion to be hung over the top of the insulating housing and apart facing to the first contact portion of the first switch terminal so as to electrically contact with the first contact portion under the pressure of the card; and
    a shielding shell covered on the insulating housing to define a receiving space therebetween for receiving the card therein.

2. The card connector as claimed in claim 1, wherein the first locating portion is of a three line break shape and has a portion of a bottom thereof protruded downward to form a first inserting portion, a bottom wall of the first switch groove defines a first inserting hole for holding the first inserting portion therein.

3. The card connector as claimed in claim 1, wherein the second locating portion is of a U shape and has a free end thereof protruded downward to form a second inserting portion, a bottom wall of the second switch groove defines a second inserting hole for holding the second inserting portion therein.

4. The card connector as claimed in claim 1, wherein a portion of the top of the insulating housing behind the second switch groove and adjacent to a rear end of the first switch groove is concaved downward to form a locating groove, a bottom of a substantial free end of the second contact portion protrudes downward to form a resisting portion located in the locating groove.

5. The card connector as claimed in claim 1, wherein a bottom of a rear end of the first locating portion extends downward and then is bent sideward to form a first soldering portion stretched behind the insulating housing, a bottom of a substantial middle of the second locating portion extends downward and then is bent rearward to form a second soldering portion penetrating downward through the insulating housing to be exposed under the insulating housing.

6. The card connector as claimed in claim 1, wherein the shielding shell has a top plate and two side plates extending downward from two opposite sides of the top plate, a corner of the one side of the insulating housing protrudes upward to form a supporting block flush with the protrusion and cooperating with the protrusion to together support the base plate over the top of the insulating housing, the receiving space is formed between the base plate and the top of the insulating housing.

7. The card connector as claimed in claim 6, wherein a rear of the top plate extends downward to form a blocking plate blocking behind the receiving space for avoiding an excessive insertion of the card.

8. The card connector as claimed in claim 6, wherein front ends of two side surfaces of the insulating housing oppositely protrude sideward to form two fixing portions, a front edge of each side plate defines a fixing groove for holding the fixing portion therein.

9. The card connector as claimed in claim 6, wherein two rear edges of the side plates are bent towards each other to form two buckling pieces, two opposite ends of a rear side of the insulating housing respectively define a buckling groove for buckling the buckling piece therein.

\* \* \* \* \*